Jan. 19, 1926. 1,569,896
I. B. TANNER
FILTERING TANK
Filed August 4, 1924
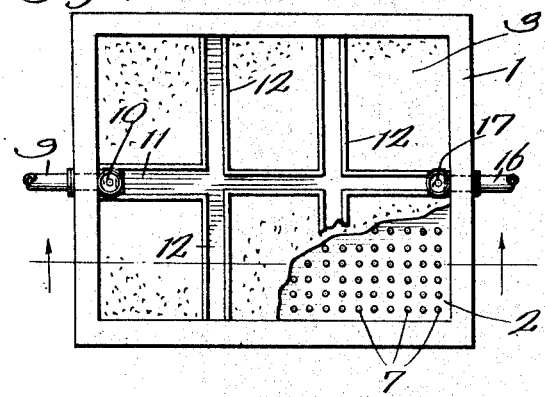
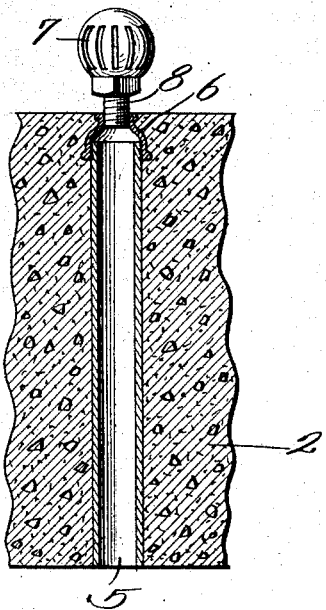
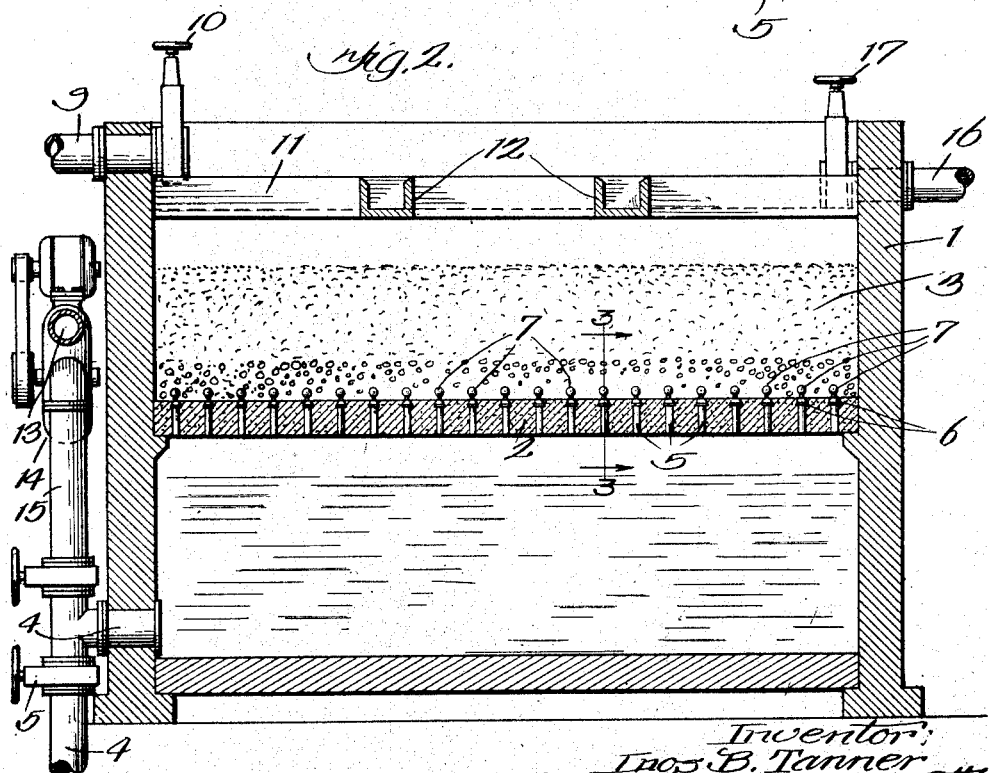
Inventor:
Inos B. Tanner Patented Jan. 19, 1926.

1,569,896

UNITED STATES PATENT OFFICE.

INOS B. TANNER, OF CHICAGO, ILLINOIS, ASSIGNOR TO JOSEPH E. NELSON & SONS, OF CHICAGO, ILLINOIS, A FIRM COMPOSED OF JOHN E. NELSON AND WILLIAM H. NELSON.

FILTERING TANK.

Application filed August 4, 1924. Serial No. 730,052.

*To all whom it may concern:*

Be it known that I, INOS B. TANNER, a citizen of the United States, residing at Chicago, in the county of Cook and the State of Illinois, have invented a certain new and useful Improvement in Filtering Tanks, of which the following is a full, clear, concise, and exact description.

My invention relates to filtering tanks and resides in an improved arrangement of the filtering heads. The filtering tank of my invention is provided with a horizontal partition spaced from its bottom and top, the partition having upright fluid conveying passages therethrough. The filtering heads communicate with these passages and are carried by the partition on its top side, each passage having a head individual thereto and in communication therewith. In the preferred embodiment of the invention, the partition is formed of moulded concrete and the passages therethrough are furnished by upright pipes that are moulded within the partition to have communication with the tank upon both sides of the partition. Nipples are also moulded within the partition, being disposed at the top side thereof. These nipples are assembled at their lower ends with the upper ends of the pipes. The filtering heads are preferably provided with hollow stems that are assembled with the upper ends of the nipples.

I also provide an improved distributing means for the liquid that is to be filtered. This distributing means resides in a trough into which the liquid is discharged and other troughs branching from this trough. The liquid to be filtered overflows the rims of the troughs and then passes through the filtering medium and the filtering heads to the space below the partition from which space the liquid may be withdrawn in its filtered condition.

The invention will be more fully explained in connection with the accompanying drawing in which Fig. 1 is a plan view with a portion broken away; Fig. 2 is a sectional view taken on line 2—2 of Fig. 1 but on a larger scale; Fig. 3 is a sectional view of part of the filter taken on line 3—3 of Fig. 2, but on a larger scale.

The filtering tank 1 illustrated is rectangular in contour. A horizontal partition 2 is disposed midway between the bottom and top of the filter to afford an upper space within which the body 3 of filtering sand and gravel may be disposed, through which the liquid to be filtered passes. The space below the partition receives the filtered liquid which may be withdrawn through an outlet pipe 4 when the valve 5 is open. The partition is desirably formed of moulded concrete. Short upright pipes 5 are moulded within the partition as are also the nipples 6 at the top of the partition. The nipples are preferably assembled with the upper ends of the pipes by being screwed thereon. In the moulding operation, temporary plugs are placed in the upper ends of the nipples to be flush therewith, the top side of the partition being smoothed to the level of the upper ends of the nipples, these upper ends being in the same horizontal plane. The filtering heads 7 are provided with stems 8 that are threaded into the upper ends of the nipples after the temporary plugs have been withdrawn.

The liquid being filtered passes through the filtering medium 3 and, having been filtered, through the filtering heads, the stems 8 of the filtering heads, the nipples 6 and the bores of the pipes 5.

The liquid to be filtered passes through the admission pipe 9 when the valve 10 is opened. The liquid is discharged from this pipe into the trough 11 that extends along the tank and is desirably co-extensive therewith. Other troughs 12 branch from the trough 11. The rims of the troughs are desirably in the same horizontal plane. The liquid flows over these rims on to the filtering medium, the troughs effecting an even distribution of the liquid so that it is evenly distributed in its passage through the filtering medium and the filtering heads.

When the filtering medium is to be cleaned, the valves 5 and 10 are closed and cleansing water is pumped through the top branch of the pipe 4 from the supply pipe 13, the motor driven pump 14 forcing the passage of the cleansing water through the pipe 15 and the upper branch of the pipe 4 into the space beneath the partition 2. The cleansing water is forced upwardly through the upright passages in the partition, this water passing through the filtering heads and the filtering medium and thence to the troughs from which it is discharged through the outlet pipe 16 when the normally closed valve 17 for this pipe is opened.

Changes may be made without departing from my invention.

Having thus described my invention, I claim:—

A filtering tank provided with a horizontal partition formed of moulded concrete spaced from its bottom and top, in combination with upright pipes moulded within said partition and communicating at their lower ends with the space beneath the partition and at their upper ends with the space above the partition; nipples moulded within the partition at its top side and assembled at their lower ends with the upper ends of said pipes; and filtering heads assembled and communicating with the upper ends of said nipples.

In witness whereof, I hereunto subscribe my name.

INOS B. TANNER.